US008909950B1

(12) United States Patent
Levchuk et al.

(10) Patent No.: US 8,909,950 B1
(45) Date of Patent: Dec. 9, 2014

(54) SYSTEMS AND METHODS OF POWER MANAGEMENT

(75) Inventors: Georgiy Levchuk, South Grafton, MA (US); Nathan Schurr, Malden, MA (US); Darby E. Hering, Charlestown, MA (US); Mitch Zakin, Andover, MA (US)

(73) Assignee: Aptima, Inc., Woburn, MA (US)

( * ) Notice: Subject to any disclaimer, the term of this patent is extended or adjusted under 35 U.S.C. 154(b) by 708 days.

(21) Appl. No.: 13/088,607

(22) Filed: Apr. 18, 2011

Related U.S. Application Data

(60) Provisional application No. 61/325,336, filed on Apr. 18, 2010.

(51) Int. Cl.
*G06F 1/26* (2006.01)
*H04M 3/00* (2006.01)

(52) U.S. Cl.
USPC .......................... 713/300; 713/320; 455/418

(58) Field of Classification Search
None
See application file for complete search history.

(56) References Cited

U.S. PATENT DOCUMENTS

| 2004/0010783 | A1 | 1/2004 | Moritz et al. | |
| 2008/0126815 | A1* | 5/2008 | Cantwell et al. | 713/323 |
| 2010/0203876 | A1* | 8/2010 | Krishnaswamy | 455/418 |

OTHER PUBLICATIONS

Description of Android Screebl application, as downloaded from the Internet on Apr. 18, 2011 from site "http://www.androidtapp.com/screebl/".
Sharkey, Jeff, "Coding for Life-Battery Life, That Is", presented at Google I/O 2009, May 2009. Accessed online at http://www.scribd.com/doc/16917367/Coding-for-Life-Battery-Life-That-Is on Apr. 16, 2010.
Mayo, R. & P. Ranganathan, "Energy Consumption in Mobile Devices: Why Future Systems Need Requirements-Aware Energy Scale-Down," HP Labs Technical Report HPL-2003-167, 2003.
Levchuk, G.; Grande, D.; Pattipatti, K.; Levchuk, Y; & Kott, A., "Mission Plan Recognition: Developing Smart Automated Opposing Forces for Battlefield Simulations and Intelligence Analyses," Proceedings of the 13th International Command and Control Research and Technology Symposium, 2008.

* cited by examiner

*Primary Examiner* — Kim Huynh
*Assistant Examiner* — Vincent Chang
(74) *Attorney, Agent, or Firm* — John J Brooks, III

(57) ABSTRACT

A method for power management comprising inferring a user behavior from an action, inferring a mission state from the action and an event, forecasting a forecasted action from the user behavior and the mission state and outputting an instruction to modify a power resource allocation based on the forecasted action. A processor based assembly for power management of at least one device comprising a means to infer a user behavior from an action, a means to infer a mission state from the action and an event, a means to forecast and a means to plan power management from the inferred information. In some embodiments, the systems and methods apply pattern recognition algorithms and pattern learning algorithms to manage the power allocation to power consuming devices.

17 Claims, 14 Drawing Sheets

|  | Android OS | Power-saving Apps | TPM |
| --- | --- | --- | --- |
| Technology description | Same power saving settings for all situations. User may turn on/off services such as Wi-Fi and GPS. No app power mode consideration. | Adjusts hardware/service settings in response to current battery level or other system characteristics, according to rules set by the user (eg., the Power Manager app, or the SCREEBL app) | Adjusts hardware power settings and app power modes to the task executed currently by the user, remaining battery life, and future task and app run requirements. |
| HW Control | Yes | Yes | Yes |
| SW Control | No | No | Yes |
| Definition of power rules | Manual | Manual | Hybrid (mission defined manually, behavior learned and power requirements forecasted automatically; user can select TPM level of automation) |
| Form of power control rules | Fixed | Fixed | Adaptive |
| Power control principle | Static | Reactive | Proactive |
| Power control activation basis | Remaining battery power | Current task | Mission (current and future tasks) and corresponding app use/power estimates |
| Data | Battery status | Battery status, device location, spatial orientation, apps currently running | Battery status, device location, spatial orientation, apps currently running, user's mission, apps' power modes |
| Power savings | Baseline | 10-25% improvement | 50% improvement |

FIG. 14

SYSTEMS AND METHODS OF POWER MANAGEMENT

CROSS-REFERENCE TO RELATED APPLICATIONS

This application claims benefit of U.S. App. No. 61/325,336, filed on Apr. 18, 2010 entitled "SYSTEMS AND METHODS OF POWER MANAGEMENT," to Mitch Zakin et al., the entire contents of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to systems and methods to manage the power consumption of electronic devices.

2. Description of the Prior Art

In the field of power management, various operating systems such as those recently released by Microsoft Corp. provide the ability for users to proactively configure specific power management configurations. Additionally, power management applications, such as Screebl, are available that control the screen timeout of an android phone based on the orientation of the phone.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

Generally, it is an object of embodiments of the invention to apply pattern recognition algorithms and/or pattern learning algorithms to enhance the management of resources. In one specific application, the systems and methods apply pattern recognition and pattern learning algorithms to manage the power allocation to power consuming devices.

It is an object of one embodiment of the invention to provide a method for power management comprising inferring a user behavior from an action, inferring a mission state from the action and an event, forecasting a forecasted action from the user behavior and the mission state and outputting an instruction to modify a power resource allocation based on the forecasted action. In some embodiments, the inferring a user behavior comprises automatically determining a probability of the user behavior from the action with a pattern recognition algorithm, the action comprises at least a first and second action, the pattern recognition algorithm comprises a first set of pattern recognition algorithm parameters for the first action and a second set of pattern recognition algorithm parameters for the second action and the method further comprises updating the second set of pattern recognition algorithm parameters according to a pattern learning algorithm.

In some embodiments of the method, the action comprises an application use representing the user selecting an application and the inferring a user behavior from an action comprises automatically determining a probability of user behavior given the application use.

In some embodiments of the method, the action comprises an application use representing the user selecting an application, the inferring a user behavior from an action comprises automatically determining a probability of user behavior according to a hierarchical probabilistic model given the application use, the event and a mission and the hierarchical probabilistic model configured to determine a P(B|U), a P(U) and a P(A|B,T,E) where P(B|U) is the probability of user behavior given the user, P(U) is a probability of the user and P(A|B,T,E) is a probability of the application use given the user behavior, a task and the event.

In some embodiments of the method, the inferring a mission state from the action and an event comprises automatically determining a probability of the mission state from the action and the event with a pattern recognition algorithm. And in some embodiments, the action comprises at least a first and second action, the pattern recognition algorithm comprises a first set of pattern recognition algorithm parameters for the first action and a second set of pattern recognition algorithm parameters for the second action and the method further comprises updating the second set of pattern recognition algorithm parameters according to a pattern learning algorithm.

In some embodiments of the method, the action comprises an application use representing the user selecting an application and the inferring a mission state from the action and the event comprises automatically determining a mission state based on the event and the application use.

In some embodiments of the method, the action comprises an application use representing the user selecting an application and the inferring a mission state from the action and the event comprises automatically determining a joint probability of the mission state according to a probabilistic attributed graph matching algorithm comprising an app use generation factor, a task relation match factor and a mission state prior factor.

In some embodiments of the method, the forecasting a forecasted action comprises automatically determining a probability of the forecasted action given the mission state and the user behavior with a pattern recognition algorithm. And in some embodiments, the action comprises at least a first and second action, the pattern recognition algorithm comprises a first set of pattern recognition algorithm parameters for the first action and a second set of pattern recognition algorithm parameters for the second action and the method further comprises updating the second set of pattern recognition algorithm parameters according to a pattern learning algorithm.

In some embodiments of the method, the action comprises the user selecting an application and the forecasting a forecasted action comprises automatically determining a probability of a future application use given the mission state and the user behavior.

In some embodiments of the method, the action comprises the user selecting an application, the mission comprises a sequence of a plurality of tasks, each task having a task state of complete or not complete and the forecasting a forecasted action comprises: automatically determining the probability of a future task given the mission and the tasks that have the task state of not complete; automatically determining a future user behavior given the future task; and automatically determining the forecasted action from the future task and the future user behavior.

It is another object of the invention to provide a processor based assembly for power management of a device comprising a means to infer a user behavior from an action, a means to infer a mission state from an event and the action, a means to forecast a forecasted action from the user behavior and the mission state and a means to output an instruction to modify a power resource allocation based on the forecasted action.

In some embodiments of the assembly, the means to infer a user behavior comprises a processor executing instructions from a computer program to determine a probability of user behavior given the application use with a pattern recognition algorithm to.

In some embodiments of the assembly, the means to infer a mission state comprises a processor executing instructions from a computer program to determine a probability of a mission state given the action and the event with a pattern recognition algorithm.

In some embodiments of the assembly, the means to forecast a forecasted action comprises a processor executing instructions from a computer program to determine a probability of the forecasted action given the mission state and the user behavior with a pattern recognition algorithm.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 14 is a table comparing embodiments the present invention to other technologies.

DETAILED DESCRIPTION OF THE INVENTION

Figure 1A:
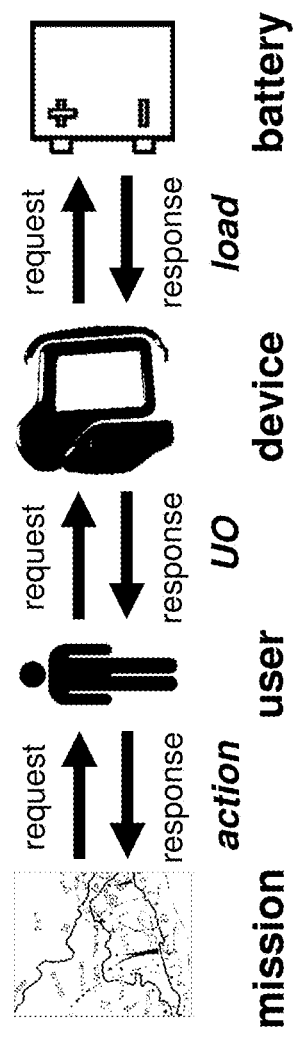
FIGS. 1A and 1B are illustrations of high level considerations of one embodiment of the systems and methods of power management.

Systems and methods for power management will now be described in detail with reference to the accompanying figures and tables. Notwithstanding the specific example embodiments set forth below, all such variations and modifications that would be envisioned by one of ordinary skill in the art are intended to fall within the scope of this disclosure. For example and not for limitation, embodiments of the systems and methods may be used to manage the power consumption of handheld devices, military equipment, building power allocation, electrical grid power allocation and any other system or network used repeatedly that utilizes power.

Embodiments of the systems and methods may also be used to allocate other types of resources used in a system or network. Examples of these applications include, but are not limited to, personnel resource allocation, allocation of attention such as in a command and control environment, allocation of budgets or allocation of computing resources.

Users of technology today balance many opposing challenges. For example, users want more performance and more sophisticated tools for more complicated uses however they want to take the tools everywhere, such as where infrastructure is sparse and resupply is difficult. The development of software applications (also referred to as "apps" herein) for mobile handheld devices is one example of the move in this direction where application type is desired to be broad and powerful and the use of these application is desired to be as broad as possible. However, such devices utilize resources such as batteries, batteries are scarce, and battery recharging has become an issue as locations become distributed broadly. For handhelds in particular, several factors exacerbate the problems of power management including: (1) increasingly sophisticated apps, especially those in their initial stages of development/deployment, are likely to require more power, which must compete with the requirements that the device support capabilities such as communication, navigation, planning, and translation; (2) operating systems such as Android allow users to run multiple apps at once, increasing the power usage and complexity of the user behaviors required for prudent power management; (3) individual user differences including mission roles, communication patterns, handheld usage training, technology operation skill and habits, group dynamics, and the performance degradation typically observed in high-stress situations create additional power usage inefficiencies; and (4) the current state of power management for handhelds relies on users to proactively remember and apply power management options and efficient behaviors as their mobile device usage changes over the course of each day. This mismatch between handheld power needs and the resources available to meet these needs creates a need for advanced energy management.

The conflicting desire for more functionality and broader usage is common of almost any power usage situation, even those that do not require battery use but still benefit from the conservation of power.

For critical situations, the optimal solution is power management that works with the user, customized to the individual user and acts autonomously, and transparently when required, and interactively (i.e., manual operation) when desired.

To address this need, the Transformative Power Management (TPM) system applies pattern recognition algorithms to forecast user specific resource allocations based observable data and inferring user behavior and activities such as tasks. In some embodiments, pattern learning algorithms are also used to enhance the ability of the system to correlate or infer parameters.

In one specific application, the systems and methods apply pattern recognition and pattern learning algorithms as a middleware service for a processor based system, such as the Android operating system (OS) that provides user-individualized power resource management for devices running multiple apps. The thrust of embodiments of this invention are shown in FIG. 1. This illustrates that given a mission, there are many factors that impact requests for the device such as the User, the Device running multiple services of varying criticality and the battery running multiple heterogeneous components. With this overview, a novel Analogy can be made that provides insight into this solution. The analogy is that people have natural ability to interact with each other to improve teamwork due to social behavioral properties. If we the system as a social organization, each component as member of this organization.

Some embodiments of TPM are able to perform different functions. TPM learns patterns of user interactions with multiple apps, and monitors app usage and residual battery life. Such patterns include combinations/types/frequencies of both apps and specific app functions, usage preferences (running apps simultaneously or sequentially), and run duration. TPM may forecast power demand based on a mission profile and user behavior. TPM may dynamically prioritize and allocate resources accordingly for optimal power use, based on the current mission status, user, and remaining power. The prioritization and allocation process will be enhanced by use of novel mission-oriented "power modes." These modes, which are optionally provided to TPM by the various apps, constitute practical tradeoffs between the properties of an app function (e.g., accuracy, granularity) and the associated power draw. TPM provides power mode suggestions to the individual apps (and/or user) in real time. TPM may provide a user-selectable level of control, ranging from autonomous to manual operation, and can be turned off completely for mission-critical apps if desired. TPM may enable users to interactively maximize their energy efficiency by providing a dashboard indicator for energy usage that operates independently of the forecasting tools. The dashboard can also be used for after-action reviews of energy usage for training purposes. TPM may be designed to be intrinsically power-efficient, by minimizing required wireless communication, computation, and user input. TPM may permit app developers to create "hooks" to the various TPM power management tools and functions, including creating and specifying app "power modes" that work with the TPM forecasting algorithms.

Thus TPM may act as a control center for power management on devices. By combining knowledge of the current state of the mission with forecasts of upcoming user actions such as selecting an application to use, TPM creates an individualized profile of power requirements. This profile is used to dynamically set priorities for optimization of power resource allocation. Thus, this approach leverages knowledge of mission requirements and user behavior to optimize mission effectiveness given available battery power. Seamless integration of TPM with individual applications via "hooks" further enhances its ability to maximize both the number of apps that can be managed effectively (i.e., limited only by the OS), and the efficiency of power usage. For battery powered devices, this energy savings translates into the ability to perform longer, more complex missions.

The concept of "power modes" as mentioned above, which are essentially a "roll-up" of power draw for a group of handheld component operations (e.g., wireless, display brightness, processor) associated with a specific action (computation, map display, etc) for a specific app, drastically simplifies the power optimization process. In autonomous operation, TPM will work transparently with individual apps to specify optimal power modes. In interactive (manual) operation, TPM will provide suggestions to the user regarding optimal selection of available apps and power modes to achieve mission goals.

One Embodiment of Transformative Power Management (TPM) Methods:

Although the following description of a power management methods and systems for a handheld device utilizing battery power and the Android OS, it is understood that these examples are limited for illustration purposes only and the methods and systems have applicability for any power utilizing system. And while the OS discussed in this example, any processor based operating system can be used with the methods and components described herein. Additionally, the technology behind these methods and systems are expected to be compatible with future operating systems for information appliances.

Since it leverages the open Android OS, the TPM system and methods will be compatible with most military and commercial Android applications, and thus its reach and impact could be profound. Expected outcomes include extension of mission duration, simplified logistics, increased device usability and consumer satisfaction, etc. Looking further out, TPM system can play a significant role in the creation of a new strategic paradigm—"energy-aware" mission or application planning—that aims to minimize energy usage across an entire mission or application set without loss of effectiveness.

The TPM methods described here are implemented through a middleware application that can (1) monitor the patterns of user interactions with the handheld device, to include combinations of apps frequently employed simultaneously or in series, expected durations of operations, and charging behaviors; (2) combine knowledge of the current state of the current mission with forecasts of upcoming user activities and actions; and (3) dynamically manage power settings and application priorities to extend battery life and thus the handheld's mission support through optimization of power resource allocation. The system can be integrated with learning tools to provide additional information, such as patterns of user interactions, profiles of power requirements and mission tasks that may be used by the system.

The TPM system and methods can combine user and mission models with activity forecasting to achieve efficiency-driven dynamic power allocation. These algorithms can work together with TPM system "hooks" that app developers will use to specify alternatives for app characteristics, allowing TPM system to optimize across the portfolio of apps at any time. Additionally, real-time, energy-usage feedback allows the user to adjust behaviors as desired. Studies of energy consumption in mobile devices have shown that handheld device energy scale-down measures can be taken to reduce energy use of different components by factors of 1.5 to 9. The TPM approach to work directly with application developers and to manage power across multiple applications and services will combine the individual possible savings for optimal efficiency.

Figure 2:
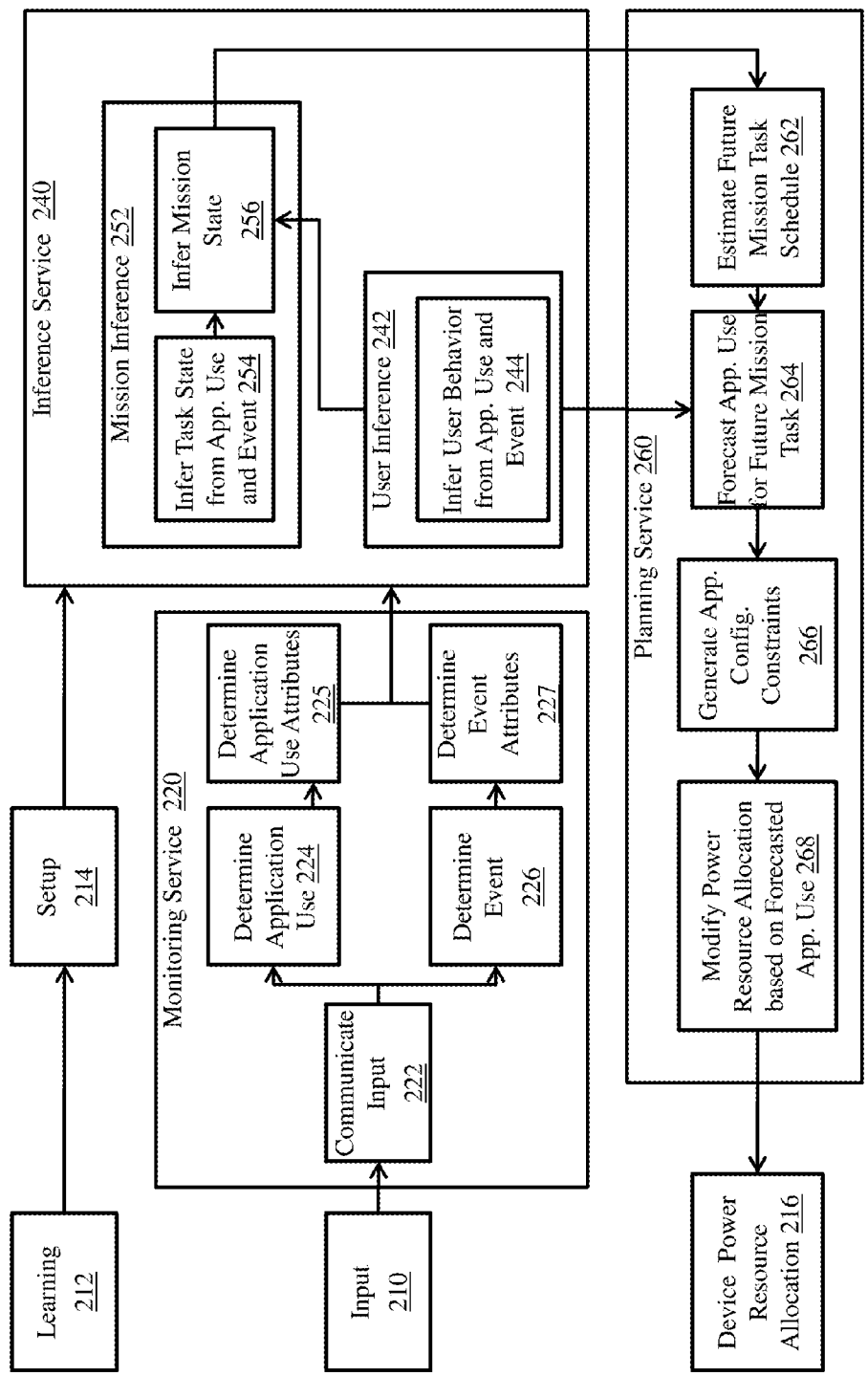
FIG. 2 is an illustration of a process flow diagram of methods according to one embodiment of the invention.

FIG. 2 shows an overview of one embodiment of the TMP methods of power management. The method generally comprises taking an input into the system and monitoring the input with the monitoring service 220. The monitoring service feeds the inference service 240 with data to infer data that can help the planning service 260 predict future actions, such as application use, by the user and then use those predictions to output an instruction to modify the power resource allocations which in turn control power usage. These steps are described in more detail below.

Figure 12:
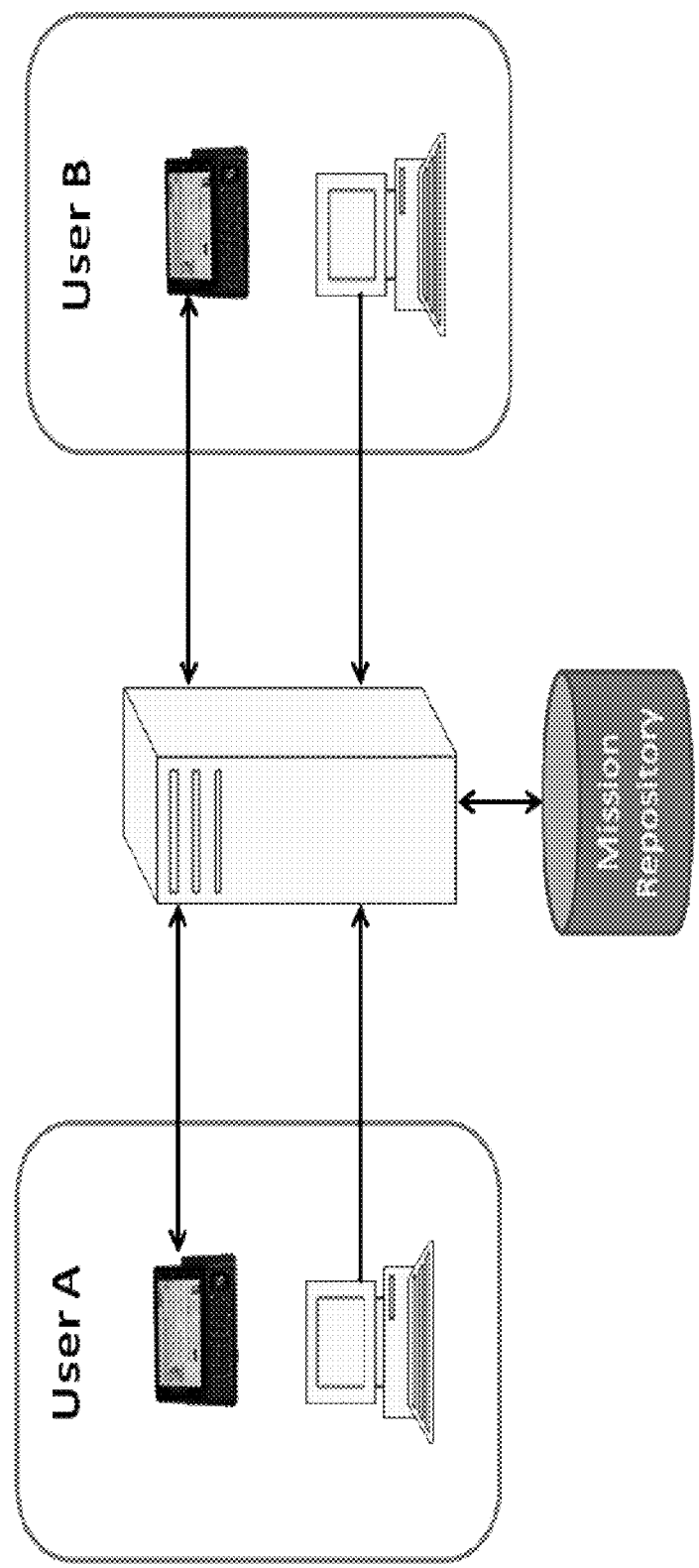
FIG. 12 is an illustration of one embodiment of a server based solution for storage of mission definitions.

In embodiments, the TPM methods will accept input from outside the system from a set of interfaces. Input can be provided by a user through a user interface or the input can be an input received from a device component such as the operating system. Typical interfaces will allow input such as allowing the user to define the mission and configure TPM preferences as well as application interfaces to inform the TPM methods of power mode alternatives and interfaces for the applications to receive power mode instructions from TPM. One example embodiment of a mission definition interface is shown in FIG. 12.

When received, the input is communicated to the monitoring service 220. The monitoring service 220 provides the process steps allowing the TPM system to receive input, recognize attributes used by the system and share these attributes with the inference service 240. The monitoring service is configured to receive and interpret messages called "Intents" that are broadcast by applications to communicate attributes such as their power modes. The monitoring service will also receive messages broadcast by the device's OS to communicate battery power status and the status of system components and services (such as CPU, DRAM, BlueTooth, screen, keypad, etc.).

Through these intents or other communication methods representing the input, the monitoring service 220 is configured to communicate the input at 222 and determine the application use 224. Application use (also referred to as "app use" herein) is a term used throughout for the action of an application that has been selected for use. From this application use 224, the monitoring service 220 is also able to determine the application use attributes 225. Application use attributes is a term to define one or more attributes of the application such as, but not limited to the name of the application, power modes of the application or any representation of these attributes. Application use attributes can be learned from TPM use at 212 or they can be provided as part of an input 210 such as the TPM setup 214.

The monitoring service is also configured to determine an event 226 and determine event attributes 227 from the input 227. An event as used throughout this description is any type of activity such as but not limited to providing an input, triggering of an OS communication or an application communication. Event attributes can be learned from TPM use or they can be provided as part of the TPM setup.

With event attributes and application use attributes determined, they are shared with the TPM inference service at 240.

The TPM inference service 240 is configured to take the event and application use attributes as input and generate an estimate or probability of the user's behavior and an estimate or probability of the state of the mission in which the user and device are involved so that a forecast of future application usage can be made by the TPM planning service. The estimates are made with the use of a mission inference step 252 and a user inference step 242. These steps utilize a mission model and a user model comprising algorithms and parameters such as pattern recognition algorithms and pattern recognition parameters. Examples of pattern recognition algorithms are described below. For these algorithms, parameters generally include those shown in FIG. 3 and include variables such as, but not limited to, mission, user, event, task, user behavior, app use as well as the probability of each of those parameters.

The user model is used to accommodate the situation where multiple users differ in their interactions with handheld devices, including what applications they will run to accomplish a task, when they initiate and terminate applications, and in what sequence they interact with the applications. User modeling is needed to both correctly infer the tasks that user is performing and forecast the future app use (what application are probable to use) requirements on the device. The user model can generally be any type of computational model that is able to define a probabilistic relationship between a user and the user use of an application or an application attribute. As used in this example embodiment, the user model is a user specific profile of a probability of application use given an event.

The user model is used by the user inference step 242 to determine an inference of a user behavior at 244 based on the user and the probability of the application use.

The mission model accommodates the situation where different missions and tasks that users must perform change the priorities of the power modes for the various applications. For example, GPS navigation updates might be critical in highly complex urban terrains when the device owner is moving at a high speed, while communication applications may be more important during site security and reconnaissance missions. The mission model provides a high level view on the context in which the user operates, including user tasks and their dependencies (e.g., sequence). The mission model can generally be any type of computational model that is able to define elements representing tasks and can also identify interrelationships between the tasks. As used in this embodiment, the mission model is a graph with nodes and links as described below.

The mission model is used by the mission inference step 252 to provide an inference of an inferred task state at 254 based on the mission, the event and the application use.

Further, with input from the user inference step 244, the mission inference step 252 is able to infer the state of the mission at 256.

Optionally, the TPM inference service can also learn the user-specific event- and task-based app use patterns from application, OS, and hardware log inputs. This learning can generally be performed by various probabilistic classifiers and pattern learning algorithms including but not limited to Hidden Markov Models, Naïve Bayesian Model, reinforcement and/or temporal different learning algorithms, temporal attributed activity networks, neural networks, etc. It is understood that the inference module is capable of inferring information from user input or execution of automated processes or sensors that are not necessarily tied to a user input.

The inferred mission state and the user behavior are then shared with the TPM planning service 260. The TPM planning service 260 uses this information to forecast future activities of the user and then generate power mode instructions for the expected applications. The planning service 260 will use the task and mission state information from the mission inference step 252 to estimate future mission task schedule at 262. The planning service 260 will then forecast the expected application use for the expected future mission task at 264 and generate any application configuration constraints at 266 which may be a schedule of application activities, aligning the power modes of the applications with task demands. These constraints are then used to update an application schedule to modify the power resource allocations for the forecasted app use at 268. The resource allocation of 268 is then communicated and used to modify the power resource allocation at 216.

In some embodiments, an output of the planning service can also be visual feedback to the user through a dashboard tracking power consumption and suggesting alternative app use behaviors.

TPM Inference Service Details:

To achieve increase power savings, the TPM methods reason about future tasks and app use ("actions") by the device operator. In embodiments, the TPM methods maintain an estimate of the state of the mission—i.e. which tasks have already been executed by the user, and which will occur in the future. Since in many impediments the users do not identify or input to the handheld in real time the tasks they are working on, and since users differ in which applications they select to run for the same task, the mission state inference in very challenging. Both user behavior and mission state inference are performed by TPM in a coordinated manner.

Figure 3:
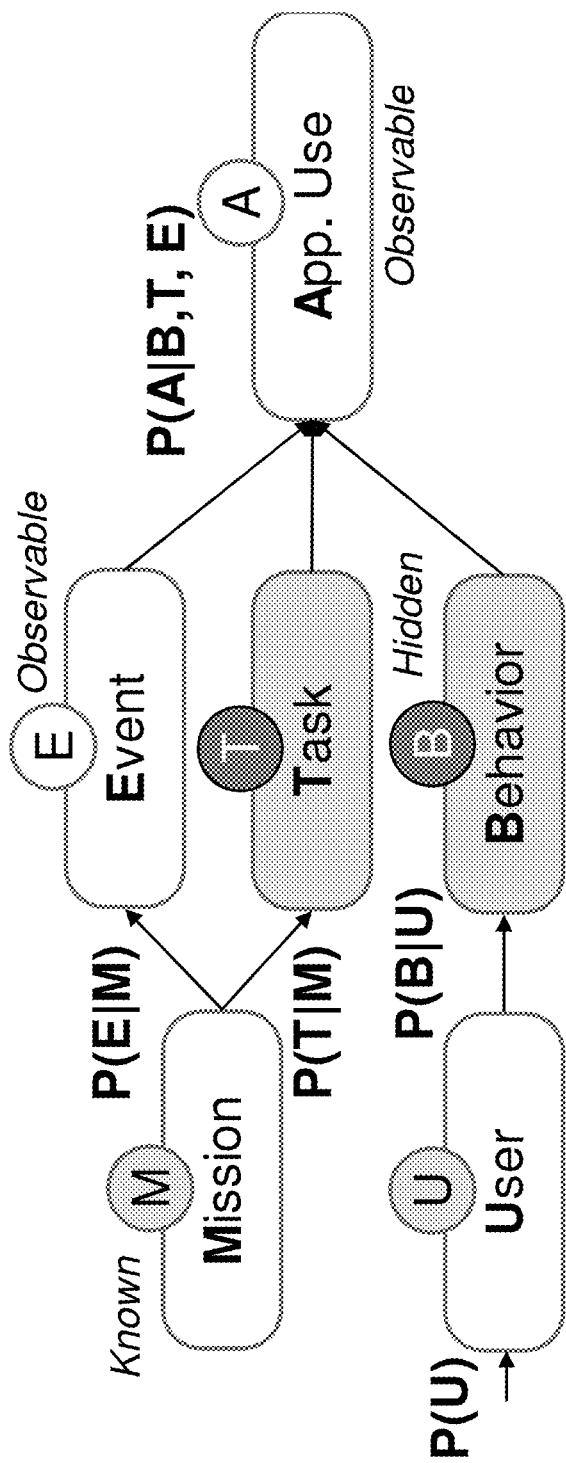
FIG. 3 is an illustration of the conceptual workflow of a generative TPM application use model according to one embodiment of the invention.

We begin our explanation of how the TPM inference service achieves its functionality by first discussing the TPM application use model. This is important because app use is the only observable data in real time, and we need to use these data to estimate the Mission and User Models. FIG. 3 graphically shows the conceptual workflow of the generative TPM application use model. When a mission model and a user model are selected, events are generated based on the mission model and are observed (registered by the user, the device, or communicated from other resources on the network such as but not limited to location, activity or reachback support). At the same time, tasks are inferred/generated from the mission model and are not directly observable, i.e. the device in general does not know what tasks the user is currently executing, and needs to make a corresponding inference. Without loss of generality and to simplify the complexity of the exposition, we omit reference to events in the following sections. The application use model represents a generative process, where the application uses are generated based on user model, task, and environment event(s); its parameters are predefined or estimated based on app use occurrences that are observed by and shared from the TPM monitoring service.

Although the illustration of FIG. 3, and the description that follows, generalizes the mission as a known and the user as an unknown, it is understood that embodiments of the invention can equally have the user as a known and the mission as an unknown. Applications of these embodiments may used when the user is know (the owner of that device is assumed to be the known user) and the mission of the user is not known (the user is travelling but for what mission/use is unknown).

Figure 4:
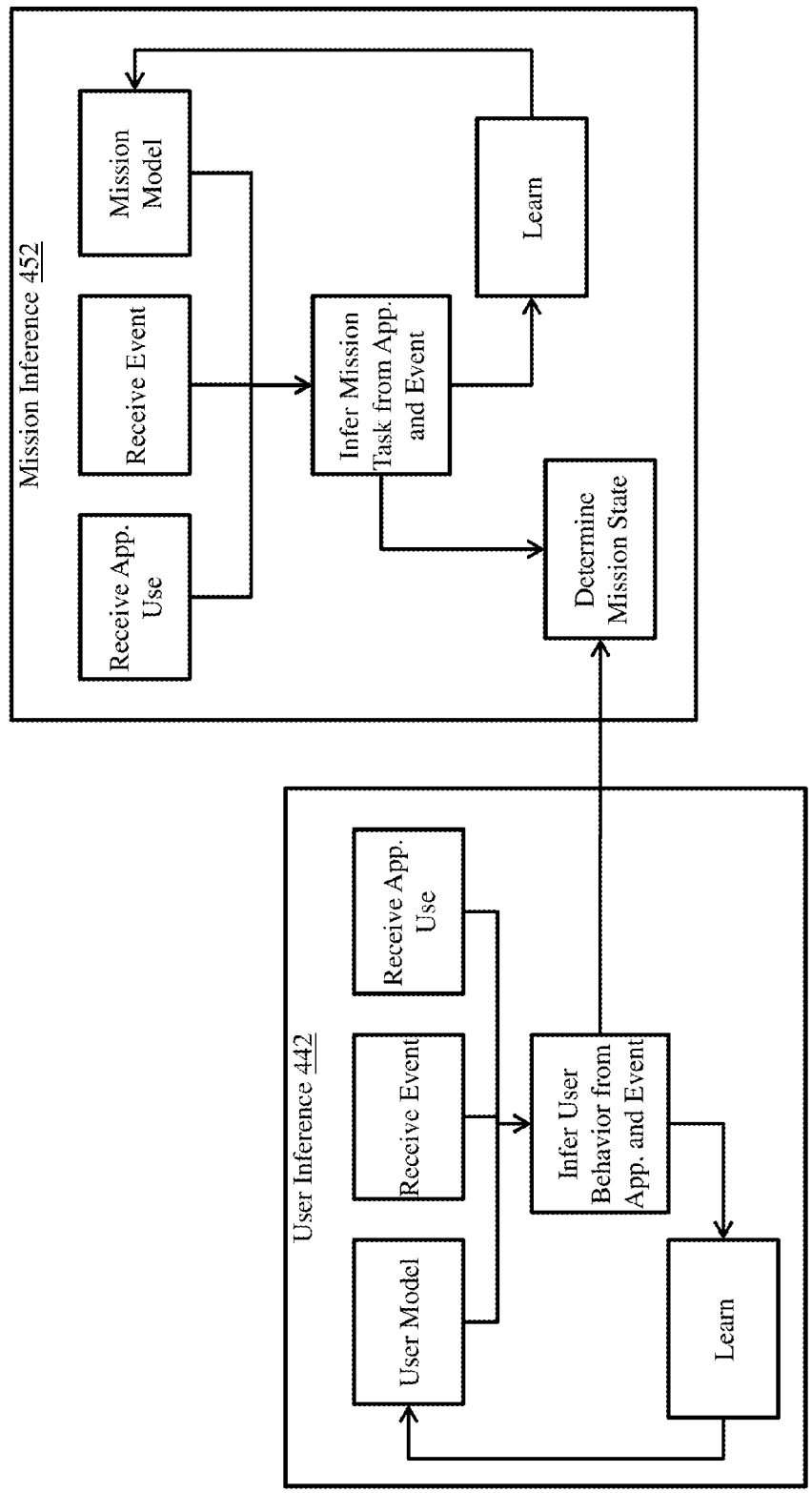
FIG. 4 is an illustration of the functional activities used in the inference service including both the mission inference and the user inference according to one embodiment of the invention.

Using the concept of the application use model, FIG. 4 illustrates the functional activities used in the inference service including both the mission inference 452 and the user inference 442.

For the user inference step 442, the application use and the event are received from the monitoring service. These parameters generally comprise the type of event and the application used. Embodiments of the methods may also include other parameters such as, the time of the event, duration of the application use, and the mode of operation. The TPM user model is provided as part of the methods and is used to define how the application use patterns are generated by the user. The user is defined using a set of behavioral categories that affect how he/she may respond to task requirements by running the applications (see FIG. 5A). These categories do not always have to be defined a-priori; instead, they can be treated as a set of hidden variables, and can be learned in unsupervised manner by finding similarities between app use patterns from different users performing the same task (Levchuk, Grande, and Ards, 2009). Behavior categories that capture the user similarities and differences can include preferences for running one application over another, e.g. using MS word instead of Wordpad to create reports; using different settings during data transfer; or waiting to communicate until better network connectivity is attained. We define user U's behavior profile via a probability of user behavior P(B|U) for each behavior category B. In some embodiments, the user will be able to define constraints on behavior categories to rank applications in a category, define his or her own categories, and select a behavior category for a given time period, thus overriding the TPM user model which makes otherwise automated inference about the user behavior category based on observed data.

To specify how app use is generated, the user model defines a vocabulary of app uses $A_1, \ldots, A_m$, where each app use is based on a feasible and known application power mode (i.e., a possible configuration of the application during use). In some embodiments, the applications subscribing to TPM can report their power modes and this vocabulary can be constructed and used by the inference service. The app use can then be generated with probability P(A|T,B,E), where E includes a set of events such as but not limited to the location where the device is operating or the terrain information. For example, a soldier on patrol may need to compose a report, take pictures, send pictures to headquarters, and maintain periodic radio communications with the team leader. In this example, depending on the events at the location where the task is executed, the amount of communications and media data transfers required may be changing over time, while the type of report app used may vary between different users according to their application preferences.

Figure 5A:
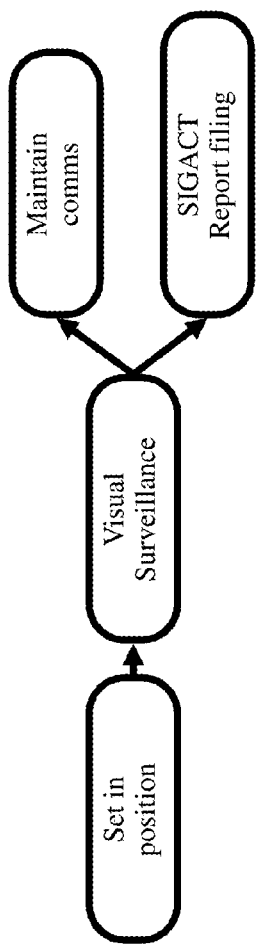
FIG. 5A illustrates an example of a mission model according to one embodiment of the invention using a precedence graph.
Figure 5B:
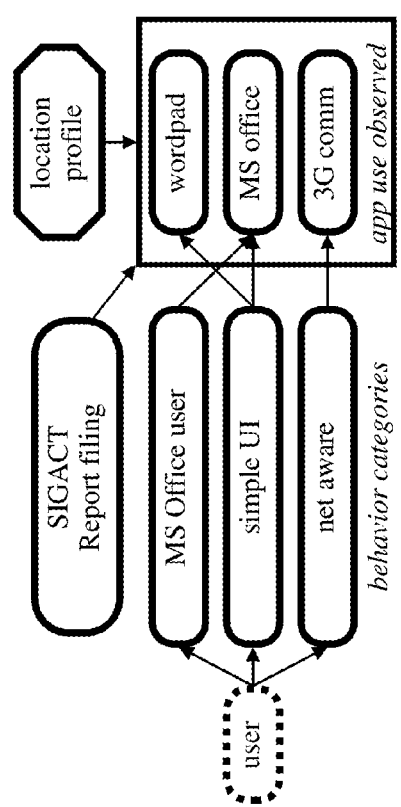
FIG. 5B illustrates an example of a user model according to one embodiment of the invention using latent behavior categories.

For the mission inference 452 step, the application use and the event are provided by the monitoring service. As described above, these parameters generally comprise the type of event and the application used but can also include parameters such as the time of the event, duration of the application use, and the mode of operation. The TPM mission model is provided by the service and defines what tasks need to be executed during the mission. In some embodiments, we assume that the vocabulary of task types is defined as part of the method setup (which for example, can be done based on the mission essential task list for a user or his role in a military unit). Examples of tasks include security, patrol, fire suppression, reconnaissance, and medical evacuation operations. Within the mission model, given a mission M, the set of tasks T is generated using probability function P(T|M) A collection of tasks and their dependencies can be represented using the concept of task precedence graph (Levchuk et al., 2003; Levchuk et al., 2006). FIG. 5A captures a sequence among the tasks in a sample mission. The inputs to the this embodiment of the mission model include a list of tasks associated with the mission, task-to-area associations (e.g., specifying that a patrol can happen on certain types of roads and that search operations can happen at other locations), and dependencies among tasks (if any, which can include precedence, information needs, duration or time delays).

In one embodiment, the mission model is formally defined using a graph with nodes and links, where node $T_k$ in the network represents a task in the mission and link $T_{km}$ represents the dependencies between tasks $T_k$ and $T_m$. Information about tasks and their dependencies is encoded using attributes on nodes and links, which conceptually define the syntactic and semantic structure of the mission. The node attributes define task location preferences (e.g., a "patrol" task may be conducted on roads, while a "search" task may be conducted inside a building), app use power modes, and duration of the task. Link attributes define spatial information among task locations (e.g., the fact that patrol and search locations should be nearby), temporal information across tasks (e.g., task precedence, synchronization, and time delays between the tasks), and information flow constraints. The mission temporal state is represented using task state variables $\tau_k$ for task $T_k$ which can take a value from a limited set (e.g., 0=task not finished, 1=task in progress, and 2=task completed). Mission dynamics (task progress over time) are represented using state probability look-up table $P(\tau_k|\Pi(\tau_k))$, where $\Pi(\tau_k)$ defines a set of states of predecessors of task $T_k$.

In addition to uniquely applying the user and mission models based on the monitoring service, embodiments of the TPM are optionally able to learn and improve the parameters used in the models. How this may be implemented in the inference service is shown in FIG. 4. Example embodiments of this learning are described below.

Algorithms to learn and infer Mission and User Models: App uses (activities) comprise inputs that are observed by the Monitoring Service of the TPM system. The counts of app uses over time can be aggregated into observation features and used to infer the behavior of a user and the tasks he or she has performed and will perform in the future. In previous work, we have developed, implemented, and validated a set of probabilistic inference algorithms to classify behaviors, missions and tasks, and to learn hidden reasons for observed activity data. This work was done in several behavior analysis domains, including inferring activities of teams of operators (Levchuk, Grande, and Ards, 2009), recognizing the mission of BLUE forces (Levchuk et al., 2008), and recognizing coordinated adversarial behaviors (Levchuk, Lea, and Pattipati, 2008; Levchuk, Bobick, and Jones, 2010). As an indication of results, in the first study we achieved an average task recognition accuracy of 77%, with some task types scoring above 90%. Employment of only the best-performing algorithm in this case would have earned 94% recognition accuracy on average.

The algorithms used in this previous research serve as foundation for learning and inferring TPM mission and user models from app use data. The algorithms differ in complexity, memory requirements, data needs, and how they capture and exploit the various semantic and syntactic structures of user behavior patterns and mission structure. These algorithms generate the required joint recognition of mission state and user behavior models for TPM. The algorithms may also be implemented suitably for a handheld device, which require scaling down and increasing the efficiency of the optimization routines.

In embodiments, we contemplate using the following hierarchical probabilistic model algorithms at various levels for pattern recognition and pattern learning algorithms to infer behavior and activity patterns:

The K-nearest neighbors (KNN) algorithm provides a case-based recognition of a task and/or user behavior class. KNN is a method for classifying objects based on closest training examples in the feature space (Shakhnarovish, Darrell, and Indyk, 2005). In the TPM application, feature inputs to KNN will be defined as app use counts over a time period.

Support vector machines (SVM) is a feature-based classifier that can capture complex differences between app use counts for different users (Cristianini and Shawe-Taylor, 2000). SVM does not learn the model of a class; instead, SVM generates decision boundaries (class-separating (n-1)-dimensional hyperplanes) and class labels for bounded areas. SVMs may find complicated boundaries that are hard to describe using models for a single task class or behavior type.

Probabilistic Latent Semantic Analysis (PLSA) uses app run counts of the user to learn unknown behavior categories causing the observed activities (Hoffmann, 2001). PLSA can operate in completely unsupervised or partially supervised (constrained) mode, without the need for a predefined taxonomy of behaviors.

N-GRAMS can exploit a weak temporal structure among app uses. This model assumes that user behaviors cannot be defined by the types of application that users run alone, but that there are preferred or typical orderings of app uses that distinguish one behavior profile from another. The algorithm discovers the user behavior classes and their descriptors in an unsupervised manner (Hamid et al., 2005).

Hidden Markov Models (HMMs) can capture strong temporal and syntactic structures among tasks in a mission. HMMs constitute a principal method for modeling partially observed stochastic processes and behaviors that have structure in time. A single HMM consists of the hidden set of states, each modeled as a task in TPM. The HMM views the mission as changing from one task to another over time. Task transition probabilities distinguish one mission from another, while task observations in the form of multiple applications used distinguish one user type from another.

Probabilistic attributed graph matching (PAGM) algorithms can capture strong temporal, semantic, and syntactic structures among tasks that can be executed in parallel. This algorithm can find estimates of the state of a mission and associations of app use to mission tasks that may occur in parallel, which traditional classifiers described above are not capable of doing. Several algorithms for solving pattern matching and network state estimation have been developed, including expectation maximization (Levchuk and Chopra, 2005), graduated assignment (Grande et al., 2008; Rangarajan, Yuille, and Mjolsness, 1999), simulated annealing (Yu et al., 2007; Han et al., 2008), and belief propagation algorithms (Bayati, Shah and Sharma, 2005; Levchuk, Bobick, and Jones, 2010). These algorithms differ in the degrees of complexity and memory use required for their execution.

TPM may be designed and constructed to run differently given the dynamically-assessed battery level and future mission demands. This flexibility will be enabled by trading off the complexity of inference algorithms used with the power consumption constraints of TPM on the device. Our knowledge of the benefits and trade-offs of different behavior recognition algorithms provides a key enabler for implementing this adaptive TPM system. In the following, we describe how two of the abovementioned models will be used for Mission and User Model inference in TPM.

Learning user behavior categorization and app use model using PLSA: In this case, user model parameters are learned by maximizing the log-likelihood of joint probability of the user behavior repository and observed app use for a fixed task, computed as:

$$L = \sum_U \sum_A n(U, A) \log P(U, A \mid T) =$$

$$\sum_U n(U) \left[ \log P(U) + \sum_A \frac{n(U, A)}{n(U)} \log \sum_B P(A \mid B, T) P(B \mid A) \right],$$

where n(U, A) are counts of application A uses by handheld user U. Since behavior categories are unknown (hidden) variables, maximization of the log-likelihood function can be achieved by using the Expectation Maximization (EM) algorithm. In the expectation (E) step we find posterior probabilities for latent behavior category variables using Bayes' rule:

$$P(B \mid A, U, T) = \frac{P(A \mid B, T) P(U \mid B) P(B)}{\sum_{B'} P(A \mid B', T) P(U \mid B') P(B')}.$$

In the maximization (M) step all probabilities are updated:

$$P(A \mid B, t) = \frac{\sum_U n(A, U) P(B \mid A, U, T)}{\sum_{A'} \sum_U n(A', U) P(B \mid A', U, T)},$$

$$P(U \mid B) = \frac{\sum_A n(A, U) P(B \mid A, U, T)}{\sum_{U'} \sum_A n(A, U') P(B \mid A, U', T)}, \text{ and}$$

$$P(B) = \frac{\sum_{U,A} n(A, U) P(B \mid A, U, T)}{\sum_{B'} \sum_{U,A} n(A, U) P(B' \mid A, U, T)}.$$

The E and M steps are iterated until convergence criteria are reached. We finally calculate $$P(U) = \sum_B P(U \mid B) P(B), \text{ and}$$

$$P(B \mid U) = \frac{P(U \mid B) P(B)}{P(U)}.$$

Figure 6:
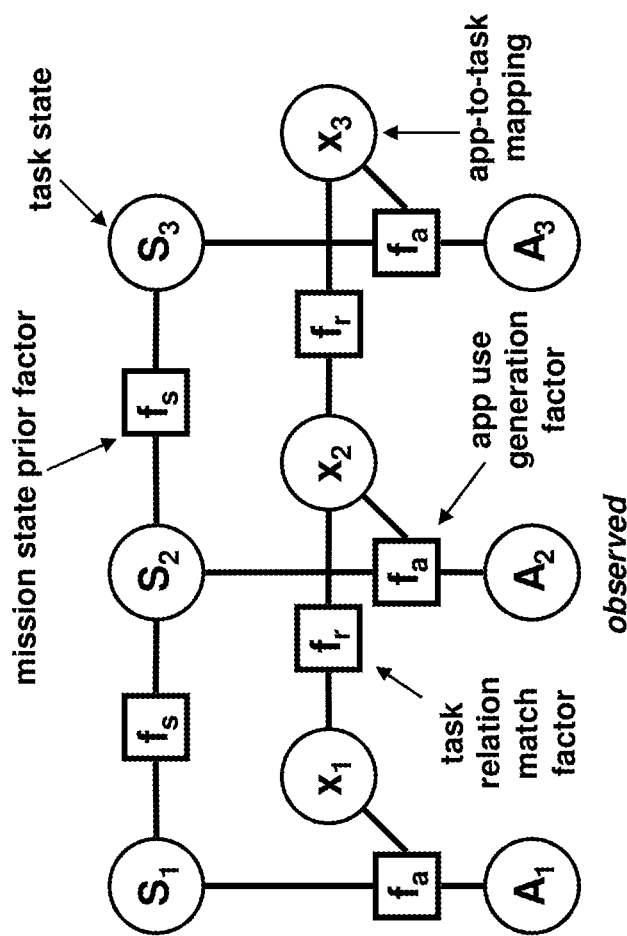
FIG. 6 is an illustration of factor graphs for task-to-app association and task state recognition according to one embodiment of the invention.

Estimating Mission Model Parameters using PAGM: As shown in FIG. 6, with this model, given observed apps uses, we infer the states of the tasks that make up a mission. We achieve this by finding estimates of the posterior probabilities for all task states and behavior categories, which are then used in the forecasting stage.

Formally, given observed app uses $A_1, \ldots, A_N$ (and their corresponding spatioteporal and information flow relations $\{A_{ij}\}$), we want to find the estimate of mission state $\tau_1, \ldots, \tau_M$. To do this, we first write a joint probability of mission state and variables $x_i$ that define association of the app use $A_i$ with task $T_{x_i}$ as follows:

$$P(\tau_1, \ldots, \tau_M; x_1, \ldots, x_N \mid A_1, \ldots, A_N) =$$

$$\frac{1}{Z} \prod_i \underbrace{P(A_i \mid T_{x_i}, \tau_{x_i})}_{\text{app generation}} \prod_{ij} \underbrace{P(A_{ij} \mid T_{x_i x_j})}_{\text{task relation match}} \prod_k \underbrace{P(\tau_k \mid \Pi(\tau_k))}_{\text{mission state prior}},$$

where Z is a normalization constant. The above formulation corresponds to a factor-graph model (FIG. 6), which consists of observed nodes (app uses), hidden nodes (mapping of applications to tasks and states of tasks), and factor nodes (multiplicative elements in the joint distribution above).

The first factor component ("app use generation factor" or "application use generation factor") in the objective function is calculated from the User Model by marginalizing the conditional app use generation probability over the user behavior categories:

$$P(A_i \mid T_{x_i}, \tau_{x_i}) = \begin{cases} \sum_{B \in B, U \in U(T_{x_i})} P(A_i \mid T_{x_i}, B) P(B \mid U) P(U), & \text{if } \tau_{x_i} = 1 \\ \alpha_i, & \text{otherwise} \end{cases},$$

where $\alpha_i$ is a small penalty associated with task-irrelevant app use, and summation is) across behavior categories and set of logs for users $U(T_{x_i})$ that performed task $T_{x_i}$.

The second factor component $P(A_{ij} \mid T_{x_i x_j})$ ("task relation match factor") is calculated as a score of the match between the application relations, such as flow of information between the applications and their synchronous uses, and task relations, such as precedence, distance, and input/output, which incorporates how the location of the device, flow of information between the applications, and the time between the app uses match the corresponding task relations.

Finally, the third factor component ("mission state prior factor") comes from the Mission Model capturing its state evolution over time (Levchuk et al., 2008).

The belief propagation algorithm is a main method to deal with reasoning on factored graphs, iteratively passing messages among its nodes. A min-sum version (Bayati, Shah and Sharma, 2005) of the belief propagation algorithm can be used to find approximations to the probabilities of task state $P(\tau_k \mid A_1, \ldots, A_N)$ and task-to-app use associations $P(x_i \mid A_1, \ldots, A_N)$ (Levchuk, Bobick, and Jones, 2010). The min-sum algorithm iteratively computes updates to the "messages" in the factor-graph model. This algorithm is iterative and can be scaled up or down to trade-off optimality and computation requirements depending on the processing capabilities of the device and power consumption restrictions we want to pose on the TPM.

TPM Planning Service Details:

Referring back to FIG. 2, given an estimate of the state of the mission at 256, TPM will proceed to forecast future task requirements and corresponding power demands on the device to develop application power mode instructions using the planning service at 260. To do this, one embodiment assumes that every application A provides to TPM a set of its run-time power modes C. A second assumption is that for each mode c∈C its power demands ρ(c) and task efficiency α(c) score are known. These values can be obtained by testing developed applications and their power modes. To provide these values, a TPM energy profile analyzer can be provided that allows application developers and others to test their application power modes and to generate power consumption and efficiency estimates. This information can then be provided to TPM in the several ways described below.

Figure 7:
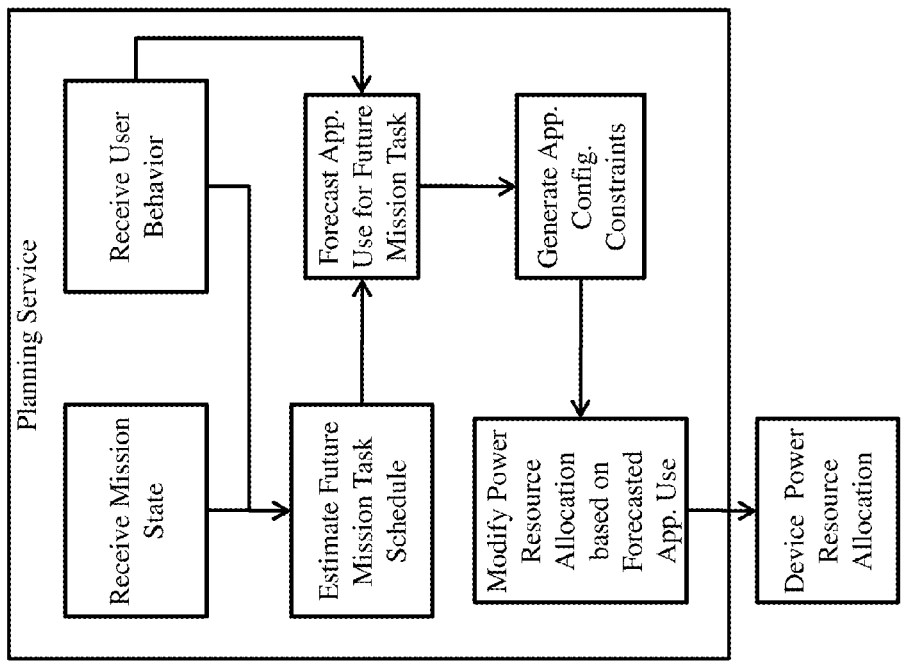
FIG. 7 is an illustration of the functional activities used in the planning service including both the mission inference and the user inference according to one embodiment of the invention.

To generate task and power demand forecasts and develop efficient application power mode instructions, we proceed in the following steps shown in FIG. 7.

Receive mission state: this includes the set of tasks in the mission and their status (completed, in progress, or not started).

Receive user behavior: this includes the estimate of the future user behavior category/profile that affects the application use; it includes probability parameters describing expected application uses by this individuals performing specific tasks while environment is characterized by a single or set of events Estimate Future Mission Task Schedule: The estimate of the mission provides us with knowledge of the tasks that have not yet been completed. These tasks are the future requirements for the user and the device. We use the mission model and the corresponding temporal attributes of the tasks and their relations to generate multiple feasible future task schedules. This will result in a set of functions $\tau_T[t]$ equal to the state of task T at time t. For example, we may forecast that a user will need to complete a SIGACT report generation task between time $t_1$ and $t_2$, in which case this task's state function will take a form $$\tau_T[t] = \begin{cases} 0, & t < t_1 \\ 1, & t_1 \leq t < t_2 \\ 2, & t_2 \leq t \end{cases}.$$

Generate Forecast of Future App Use for Future Mission Task: Using the TPM App Use Model, we generate a stochastic "future" for the app use requirements by sampling a variable $y_i[t] \in \{0,1\}$ using probability of app use $$P(A_i^{future} \mid A_i^{observed}, \tau_T[t]) = \sum_B \underbrace{P(A_i^{future} \mid B, \tau_T[t])}_{\text{app use model}} \underbrace{P(B \mid A_i^{observed})}_{\text{user behavior model}},$$

where component probabilities are based on learned behavior and application generation for the user of the device. In other words, $y_i[t]=1$ if we expect application $A_i$ to be run by user at time t, and it is 0 otherwise. The set of application power modes $C_i[t]$ will then become empty if the application is not expected to be run at time t (i.e., $y_i[t]=0 \Rightarrow C_i[t]=\emptyset$).

Generate Application Configuration Constraints: With a forecasted app use, a set of application mode constraints at time t becomes the state of the user $S[t]=\{C_i[t]\}$. Based on the knowledge of task states over time, TPM will know the location of the user and the device in the area of operation. These locations will place constraints on some application configurations (e.g., availability of communication protocols such as "3G" or "EDGE" will change the modes in which communication applications can run). Hence, we will define the set of application power modes for every application $A_i$ at time t as $C_i[t] \subset C_i$.

To find the most efficient application power modes over time, we then need to solve the following optimization problem:

$$\max \sum_i \alpha(c_i[t]), \text{ s.t.} \begin{cases} \sum_t \sum_i \rho(c_i[t]) \leq P \\ c_i[t] \in C_i[t] \end{cases},$$

where P is the total available battery power at the current time. This problem is a variant of the well-studied knapsack model and can be solved efficiently using algorithms that trade off optimality of the solution and run-time efficiency for the lightweight TPM application, including greedy algorithms, stochastic sampling, and pseudo-polynomial solutions (Mortello and Toth, 1990).

Modify Power Resource Allocation Based on Forecasted App. Use: The solution will be a set of instructions for each application $A_i$ to run in power mode $c_i[t]$ at time t that will be sent to applications directly when TPM is running under autonomous operation, or presented to the user for approval in the case of interactive operation.

The approach above can be extended to the case in which multiple alternative applications could be used to execute the tasks. For example, a user's behavior preferences might be to use MS Word to create reports on the device, while Notepad or WordPad might allow execution of the same task with decreased power consumption. TPM will then provide feedback to the user about more efficient alternative applications with their corresponding potential power saving characteristics through the dashboard component to be developed in Phase 2.

Figure 1B:
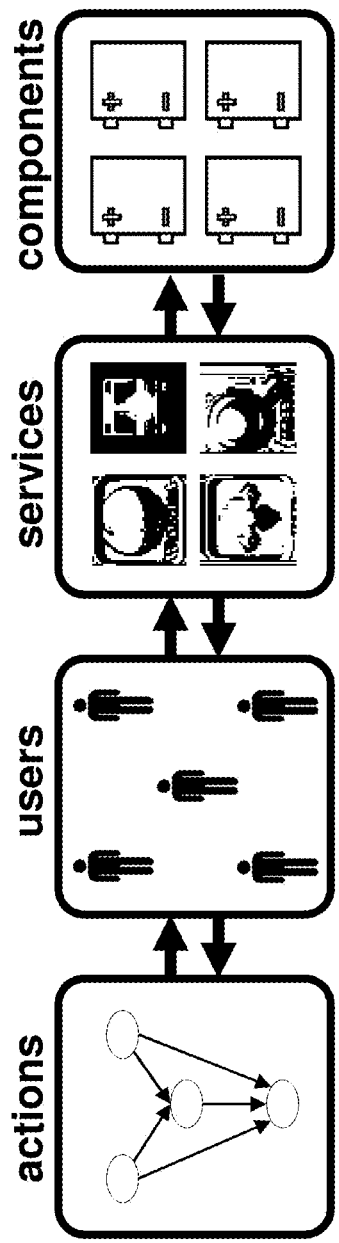

One Embodiment of a Transformative Power Management System:

As shown in the functional diagram on FIG. 1A, the TPM system is a middleware service that acts as a control center for the applications executed at the handheld device. The TPM system will generate instructions for a device's applications to run in coordinated power-saving modes. The TPM system functionality is supported by the ability to learn patterns of user interactions with multiple applications on handheld device. These patterns are used by the TPM system to forecast future task needs and application execution, and to estimate the corresponding power requirements. As shown in FIG. 1B, the TPM system then generates instructions for individual applications to run in a specified power mode, optimizing effectiveness of current task execution while supporting future power needs.

Figure 13A:
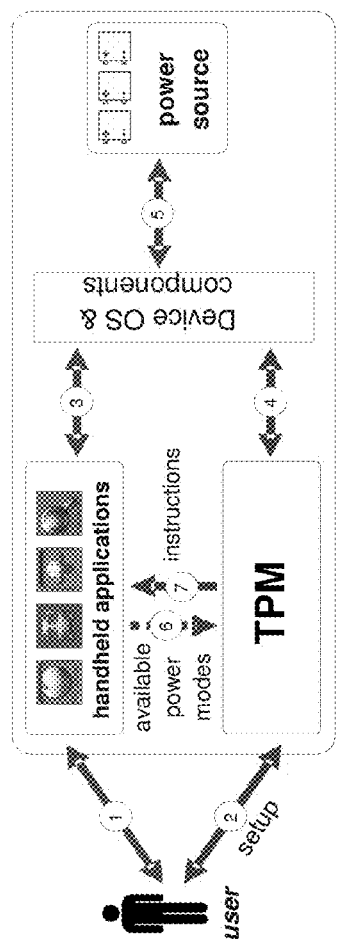
FIG. 13A illustrates an example high-level workflow of a user and device with one embodiment of the invention.
Figure 13B:
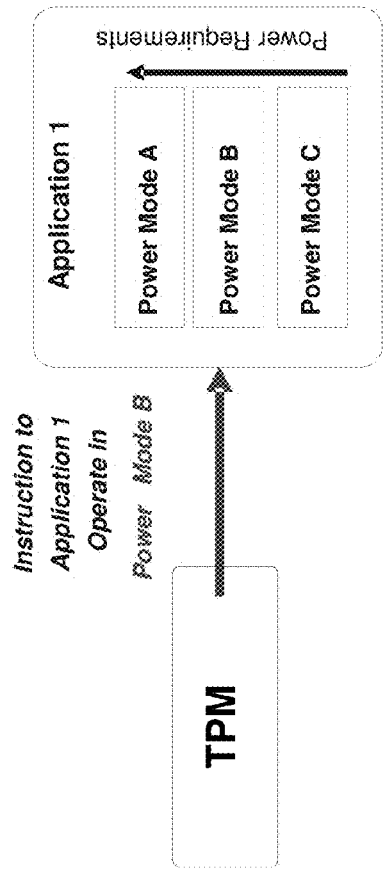
FIG. 13B illustrates an example high-level workflow of one embodiment of the power management system and an application.

Referring to FIG. 13A, the TPM system does not change the fundamental elements of the interaction of the user with the standard handheld applications (FIG. 13A, arrow 1), between applications and the operating system (FIG. 13A, arrow 3), or between the operating system and the power source (FIG. 13A, arrow 5). Instead, it enables the applications to achieve more coordinated operations by providing them with run-time power mode instructions. An instruction sent to the application (FIG. 13A, arrow 7) contains the suggestion that the application run in a specific power mode (as shown in FIG. 13B). Together, multiple applications' power modes achieve globally optimal power savings, while satisfying the task and mission requirements. The TPM's interaction with the Operating System (OS) (FIG. 13A, arrow 4) is similar to other applications. TPM will introduce new setup and interaction interfaces with the user (FIG. 13A, arrow 2), by which the user can enter specifications for a mission, change the configuration of TPM, and receive feedback from TPM about applications' power use over time along with suggestions for alternative power-saving behaviors.

TPM uses the knowledge of available power modes for different applications and their trade-offs in power consumption and efficiency for executing different tasks. Thus, two critical requirements for achieving expected power saving levels are (i) the ability of the handheld applications to operate in different power modes that trade off power draw and task effectiveness; and (ii) ability of TPM to obtain the knowledge about these modes. Knowledge of feasible power mode configurations can be provided by the applications to TPM (FIG. 13A, arrow 6) in one of three ways: by sending a message to TPM each time the application is initialized; by responding to a request message from TPM directly; or by writing power mode specifications to the Preferences of Android OS as a string that can be retrieved by TPM.

Figure 8:
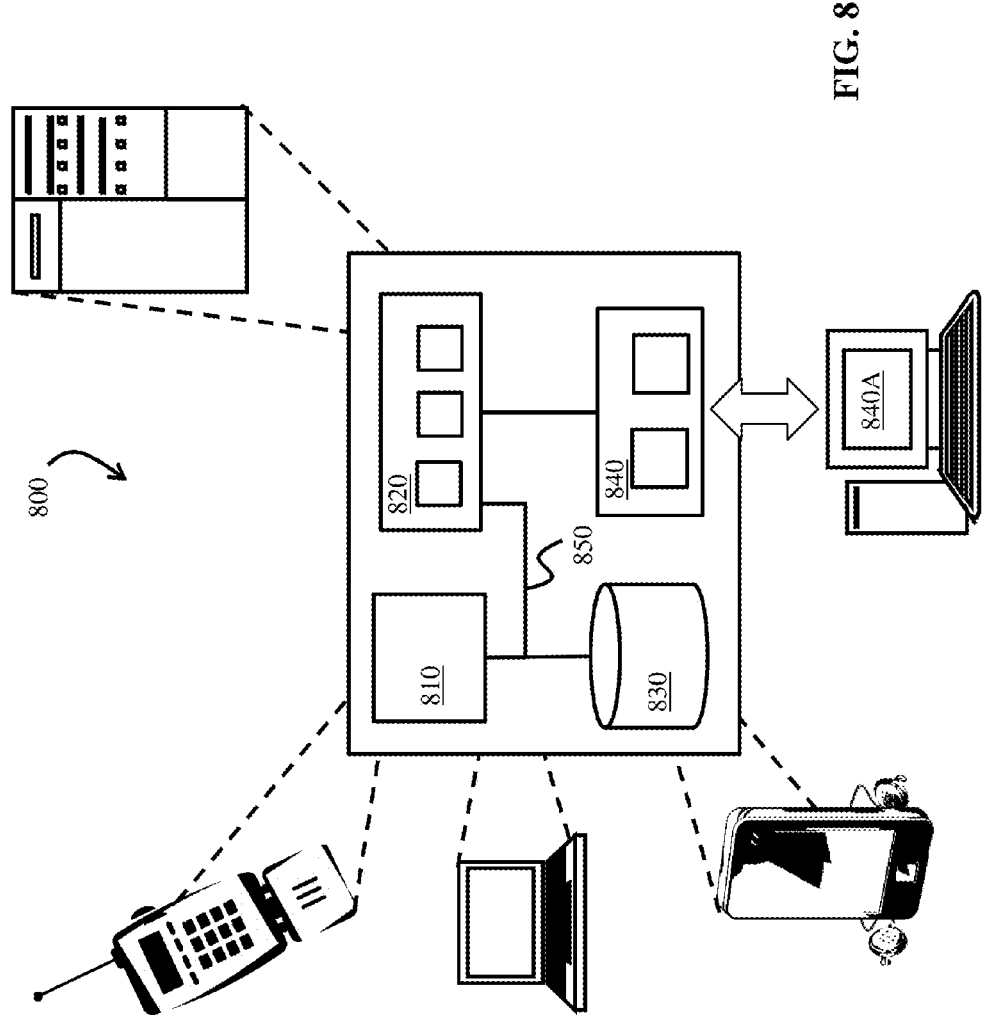
FIG. 8 is a schematic diagram of a generic computer system for use with one embodiment of the invention.

The various method embodiments of the dynamic process modeling assembly will be generally implemented by a computer executing a sequence of program instructions for carrying out the steps of the methods, assuming all required data for processing is accessible to the computer, which sequence of program instructions may be embodied in a computer program product comprising media storing the program instructions. One example of a computer-based dynamic process modeling assembly is depicted in FIG. 8 herein by which the method of the present invention may be carried out. The assembly includes a processing unit, which houses a processor, memory and other systems components that implement a general purpose processing system or computer that may execute a computer program product comprising media, for example a compact storage medium such as a compact disc, which may be read by processing unit through disc drive, or any means known to the skilled artisan for providing the computer program product to the general purpose processing system for execution thereby.

The computer program may also be stored on hard disk drives within processing unit or may be located on a remote system such as a server, coupled to processing unit, via a network interface, such as an Ethernet interface. The monitor, mouse and keyboard can be coupled to processing unit through an input receiver or an output transmitter, to provide user interaction. The scanner and printer can be provided for document input and output. The printer can be coupled to processing unit via a network connection and may be coupled directly to the processing unit. The scanner can be coupled to processing unit directly but it should be understood that peripherals may be network coupled or direct coupled without affecting the ability of workstation computer to perform the method of the invention.

As will be readily apparent to those skilled in the art, the present invention can be realized in hardware, software, or a combination of hardware and software. Any kind of computer/server system(s), or other apparatus adapted for carrying out the methods described herein, is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or reproduction in a different material form.

FIG. 8 is a schematic diagram of one embodiment of a generic computer system 800. The system 800 can be used for the operations described in association with any of the computer-implemented methods described herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display information for a user interface on the input/output device 840.

The memory 820 stores information within the system 800. In some implementations, the memory 820 is a computer-readable storage medium. In one implementation, the memory 820 is a volatile memory unit. In another implementation, the memory 820 is a non-volatile memory unit.

The storage device 830 is capable of providing mass storage for the system 800. In some implementation, the storage device 830 is a computer-readable storage medium. In various different implementations, the storage device 830 may be a floppy disk device, a hard disk device, an optical disk device, or a tape device.

The input/output device 840 provides input/output operations for the system 800 and may be in communication with a user interface 840A as shown. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them such as but not limited to digital phone, cellular phones, laptop computers, desktop computers, digital assistants, servers or server/client systems. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a computer program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) or Plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Figure 9:
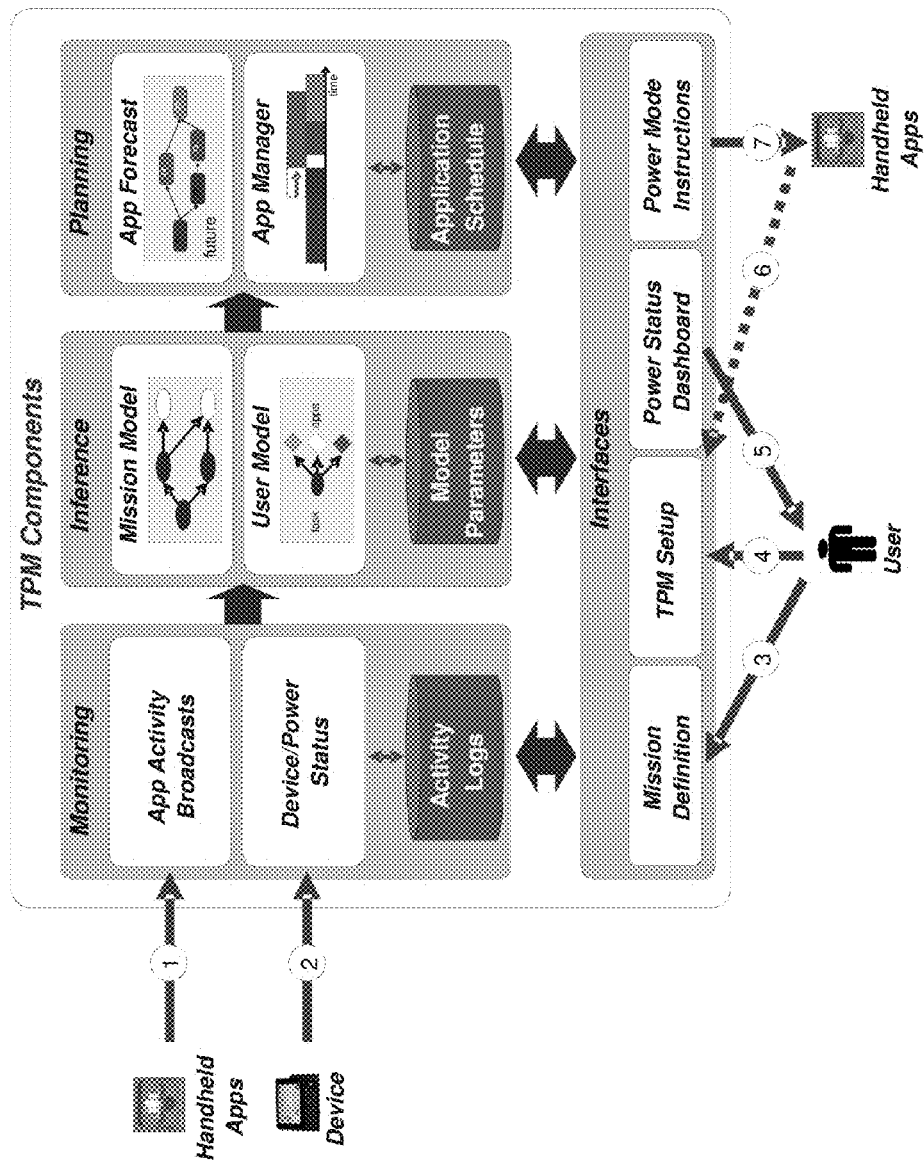
FIG. 9 illustrates a functional overview of one embodiment of a computer program implementing the methods of the invention.

A functional diagram of one embodiment of the computer program capable of executing the described methods is shown in the functional diagram in FIG. 9.

TPM Functional System Architecture:

FIG. 9 presents a functional overview of the TPM software, which consists generally of three core services, each composed of several functional components, and a set of interfaces to the user and to other applications.

First, the TPM Monitoring Service will enable TPM to receive and interpret messages called "Intents" that are broadcast by applications (FIG. 9, arrow 1) to communicate their power modes. The Monitoring Service will also receive messages broadcast by the device's OS (FIG. 9, arrow 2) to communicate battery power status and the status of system components and services (such as CPU, DRAM, BlueTooth, screen, keypad, etc.).

Activities of applications and hardware components will be stored in a log used by the TPM Inference Service, which will generate an estimate of the user's model and stage of the mission in which the user and device are involved. Mission and user model parameters will be stored and modified locally by algorithms. Different missions and tasks that users must perform change the priorities of the power modes for the various applications. For example, GPS navigation updates might be critical in highly complex urban terrains when the device owner is moving at a high speed, while communication applications may be more important during site security and reconnaissance missions. The mission model provides a high level view on the context in which the user operates, including user tasks and their dependencies (e.g., sequence).

Users differ in their interactions with handheld devices, including what applications they will run to accomplish a task, when they initiate and terminate applications, and in what sequence they interact with the applications. User modeling is needed to both correctly infer the tasks that user is performing and forecast the future app use requirements on the device. The TPM Inference Service will gradually learn the user-specific event- and task-based app use patterns from application, OS, and hardware log inputs.

It is understood that the inference module is capable of inferring information from any type of action, whether user input or execution of automated processes that are not necessarily tied to a user input.

The TPM Planning Service is designed to generate power mode instructions for the many applications. The first step toward this end is that task and app use forecasting is performed by TPM. The Application Manager component will then generate a schedule of application activities, aligning the power modes of the applications with task demands. The Planning Service will maintain and update the Application Schedule and generate corresponding power mode instructions for the applications.

Finally, TPM will contain a set of interfaces for allowing:
the user to define the mission (FIG. 9, arrow 3) and configure TPM preferences (FIG. 9, arrow 4)
applications to inform TPM of their power mode alternatives (FIG. 9, arrow 6)
TPM to communicate power mode instructions to the applications (FIG. 9, arrow 7), and
TPM to provide visual feedback to the user through a dashboard tracking power consumption and suggesting alternative app use behaviors (FIG. 9, arrow 5).

Activity Logs, mission and user Model Parameters, and the Application Schedule may be stored in a local device's database such as a SQLite database system. These data stores will be populated with small amounts of data as the user interacts with the system.

For embodiments with the Android operating system, three components of the Android operating system assist in providing the functionality of TPM architecture.

Activity is an Android OS base class component which a user directly interacts with, such as a User Interface window of an application. An Activity has a series of states based on user interaction with the system, and its behavior is affected by its current state. When a second Activity is started, the first Activity is put into a paused state until it is resumed. The transition between states is important to note in modeling how applications consume power as the activity which is in the running state has priority over any other activities in regards to the processor cycles. The TPM will use the Activity component for Mission Definition, TPM Setup, and Power Setting Dashboard.

Intent is a message containing the description of an action to take place or an event that has occurred within the operating system. Intents may contain some action names, categories or data fields which act as mailing address labels when sending Intents in Android. The operating system will try to find a recipient for the Intent based on defined fields. Within the TPM architecture, Intents will be used to pass data between TPM and the third party applications, relaying power mode settings instructions to other applications and receiving their activity information.

BroadcastReceiver is an Android component which receives Broadcast Intent objects sent by other system components. A BroadcastReceiver may declare a series of categories or data to help the OS determine whether the receiver is the appropriate destination for a broadcasted intent. The TPM API documentation will include a thorough list of categories (1) needing to be defined by third party BroadcastReceivers in order that they are able to receive TPM application power mode Intents; and (2) that applications should specify when sending Intents to the TPM system.

The TPM architecture will use the BroadcastReceiver component for developing its Monitoring Service. For example, the Android Activity Lifecycle dictates that all Activities have functions that are called when an Activity is created, resumed, or restarted. Taking advantage of this information, we will require all applications conforming to TPM API guidelines to send an Intent message to TPM during each of these lifecycle phases (FIG. 2, arrow 1). TPM will respond with an Intent explaining which power mode is best for the application to run in given the current mission context.

TPM Power Management Claim:

Studies of energy consumption in mobile devices have shown that handheld device energy scale-down measures can be taken to reduce display energy by factors of 1.5-5 and achieve factors of 1.3 to 9 better energy use in wireless subsystems that use energy during "idle" periods between transmitting and receiving.

For the Android platform in particular, Jeff Sharkey of Google has presented calculations regarding commonly used systems and their battery power draws. In this presentation, we see, for example, that applications in the background often "wake up" every 10 minutes just to update, and this can take 350 mA per occasion. Over one hour, a single application can use 4.6 mAh in updating, and this compounded when multiple applications update in an unsynchronized manner. The TPM system will work to coordinate and/or reduce these update power spikes as mission requirements demand. More impressively, Sharkey shows that transferring a 6 MB file takes 45 mAh with EDGE, 9.5 mAh with 3G, and 4.4 mAh on Wi-Fi. This gives TPM users the opportunity for a 2-to-10× battery savings for this operation when TPM is working to manage file upload priorities and network availabilities during critical mission activities. Finally, Sharkey gives us an indication that LCD during normal use requires about 100 mA, and the GPS radio over 200 mA.

The Motorola Droid uses a 1400 mAh Lithium Ion battery. The frequency with which data is transferred, and the numbers of applications running in the background will vary over time and across mission. Assuming that half of the handheld use over mission involves wireless communication or GPS, an improvement by a modest factor of 4 during idle periods, together with the anticipated 2-10× battery savings during active data transfer should bring the user an average power savings of 50% when using TPM.

TPM versus alternative power saving applications: The Android operating system prevents applications from directly affecting how other applications perform their tasks. This includes killing applications, limiting thread priority, and changing programmatic objects which might be used to control how often polling occurs. Current energy conservation applications in the Android marketplace allow a user to turn off the more power-consuming hardware components on the device when a given battery threshold is passed. These will extend the lifetime of the battery, but at what performance cost? What if the disabled GPS was vital for mission completion? What if the 3G connection needed to call for air support was disabled because the battery charge was below 50%? These rules limit system functionality based only on energy remaining, without consideration for the real-time needs of the user. The applications, however, are able to control their functionality to be more considerate of battery levels. If an application were able to translate the remaining battery level along with its own importance in the mission into a mode that would use enough energy to get the job done without using extra energy, it would be able to run as needed and yet allow other applications, which may also be critical, to run as required.

FIG. 14 highlights the differences between TPM and alternative power-saving approaches. The main advantage of TPM over static power saving tools or task-based power setting applications is that TPM can adaptively and proactively trade off current energy utilization using the knowledge of current and future power demands and availability. TPM also finds globally optimal app run modes—which cannot be achieved by individual applications operating independently.

Alternative Embodiments of the TPM System:

To support the development of applications that conform to our API and are thereby able to take advantage of the TPM algorithms, the TPM toolkit will include a codebase to support application developers in identifying alternative power modes for managing the energy use/performance trade-offs. These modes may include parameters such as:

The frequency with which the application polls GPS or remote servers

The resolution of the GPS employed by the application (assisted mode, etc)

The sizes of files being recorded or wirelessly transmitted

The adaptive communication and transmission location

The level of screen brightness employed.

This strategy allows the TPM system to tap into the vast energy efficiency available by dealing directly with each $3^{rd}$ party application's domain. These applications know best how to scale back their consumption rates while maintaining utility. With this functionality, we manage the portfolio of applications in use by guiding them to energy use profiles consistent with the current mission goals and future requirements.

In autonomous operation, TPM will work transparently with individual applications to specify optimal power modes. In interactive (manual) operation, TPM will provide suggestions to the user regarding optimal selection of available applications and power modes to achieve mission goals. In this interactive operation, TPM will interact directly with handheld device users to accept mission and preferences information, to obtain approval for power mode instructions in real-time (if desired), and to provide feedback regarding the applications' power usage and the efficiency of user behaviors.

Since missions can evolve quickly and change often, we cannot place a burden on the users to communicate to the device what tasks they are currently involved in and how the demands of the mission change over time. Instead, our technology will employ adaptive plan learning, recognition, and tracking based on multi-attribute graph matching and/or probabilistic latent mission goal model to estimate the structure of the mission and track its evolution over time. At all times, the user may be able to disable TPM processing and management if desired.

One component of the TPM system involves working with the application developer community to develop the framework of application power mode dimensions they can use to specify and manage the trade-offs in power consumption and performance for their applications. To communicate instructions regarding these power modes back and forth during use of the handheld device TPM requires other application developers to include our API hooks in their development. In the open Android Market, this model might not be successful. The reason for this is the buy-in required by other application developers for a technology which is not globally accepted within the Android Market. The open Market has a competitive atmosphere, including many applications whose capabilities overlap with each other in some way. Application developers may not be able to be certain which other applications will become mainstream.

In one embodiment of the system, the number of applications is limited which provides redundant benefits to the users, and allows for a clear indicator that an application is to be adopted by the user community. It would be inefficient for all applications to independently monitor the mission state, how their functionalities are required by the mission, and to have application logic monitoring and adjusting to the remaining battery life. It would also be inefficient for TPM to control all aspects of battery consumption regardless of the individual application needs. The TPM solution supports application developers working together with TPM system-wide monitoring to overcome these challenges, aided by the following two components.

Figure 10:
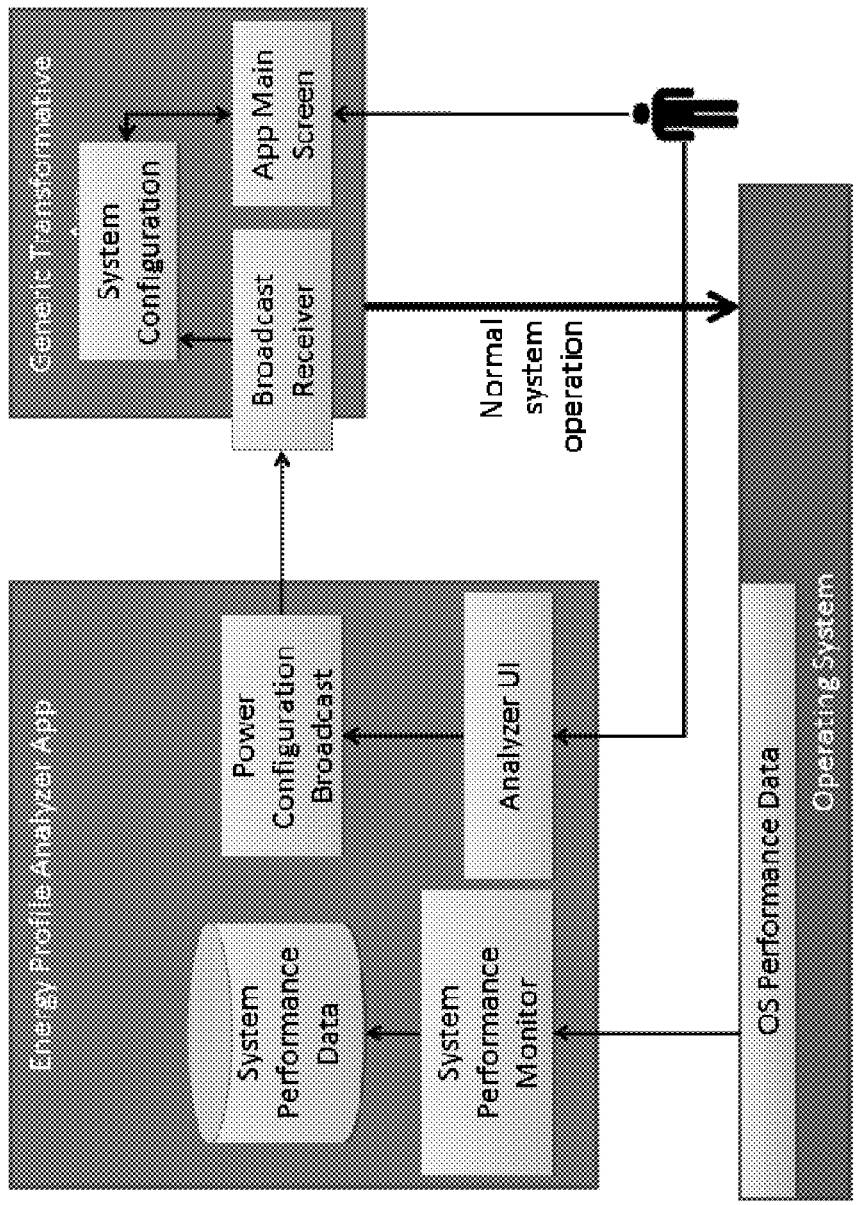
FIG. 10 illustrates an overview of one embodiment of a energy profiler.
Figure 11:
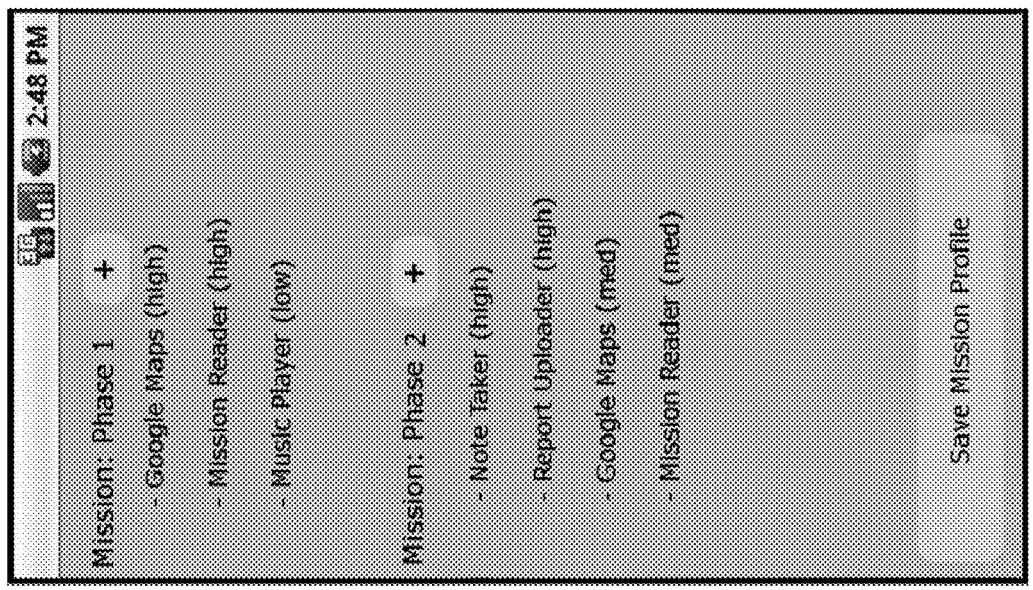
FIG. 11 is an illustration of one embodiment of a mission definition user interface displaying mission composition.

Energy Profile Analyzer Application: As shown in FIG. 10, the TPM Energy Profile Analyzer Application will monitor resource consumption of third party applications under each level of our energy conservation scale. This will be handled as a set of experiments, in which the Energy Profile Analyzer will send the Intents to each application, instructing it to perform in particular a power mode and then monitoring and recording the application's performance. In these tests, the power mode is the independent variable, and the resulting power consumption is the dependent variable. The System Performance Monitor component monitors and logs the experiment data. The Energy Profile Analyzer Application will repeat this process for each of the application's power modes, until it has resource consumption metrics for each mode.

Mission Definition Server-Based Solution: In embodiments, it is possible to expand the Mission Definition component into a server-based solution. This enhanced component will be able to store multiple user missions in a single, easily accessible repository. The server-based approach will also allow a user to enter his mission details via a web-interface, rather than using the handheld device itself. The benefit of offloading these mission storage and mission entry responsibilities is that it reduces the burden on the handheld devices in two ways. First, central storage of missions will reduce the amount of data needed to be stored on the mobile devices. Second, web-based mission entry will require less power to be consumed by the device when the user creates a, and this brings an added benefit to the user in that he is able to enter his mission details using a computer (full display, keyboard, mouse, advanced multi-tasking ability) rather than the smaller handheld device. A conceptual diagram of this system enhancement is shown in FIG. 12. Considerations for implementation of this solution will include the robust development required to work in an environment of unreliable tactical networks, not being able to count on the presence of any specific node, and understanding that the transmission can be spotty and unreliable.

Energy Savings Display Component: The Energy Savings Display component will provide the user with an at-a-glance display of how his or her battery power is being conserved by using the TPM system. This is similar to the Toyota Prius display that provides Prius drivers with energy consumption feedback that they can take advantage of by manually adjusting their driving style to reduce energy consumption or increase vehicle performance. Similarly, the Energy Savings Display component will allow the TPM user, in addition to benefitting from the automated TPM power management, to adjust behaviors to increase performance or extend battery life with feedback on the resulting performance change.

Typical v. Current Use Display Component: The Use Display component will build upon the Energy Savings Display to additionally show the user how his current handheld device energy consumption rate compares to a typical energy consumption rate. This would provide additional context for the TPM feedback to the user that allows him to see the benefits of any behavior changes he should undertake.

Development Toolkit Details: The TPM Development Toolkit may provide third party application developers with all of the tools which they need to utilize the functionality of the TPM system within their own applications. The Toolkit can be made available for distribution to other developers and may include documentation and sample applications. The documentation provides application developers with an explanation of what the TPM system is, why it is useful, and how to utilize it within their applications. Power mode development guidelines may be included in this documentation, to provide the other developers with an easy to understand explanation of how to identify and develop appropriate power modes addressing different energy consumptions levels across different kinds of applications. The aforementioned TPM Energy Profile Analyzer application may be provided to interested developers so they are able to verify that their applications meet the energy/performance trade-off standards outlined in this documentation. The last piece of documentation is an API document that will provide interface information for interaction with the TPM system. The API will include what messages TPM will send the application, and what messages the application should send TPM, and the implications of each of these.

The Toolkit will also contain a set of simple sample applications which demonstration utilization of the TPM API. The applications will demonstrate the TPM lifecycle of sending and receiving messages, so that other application developers will be able to see an example of the API in use.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:
1. A method for power management, said method comprising:
   inferring a user behavior of a user from an action;
   inferring a mission state of a mission from the action and an event;
   forecasting a forecasted action from the user behavior and the mission state;
   outputting an instruction to modify a power resource allocation based on the forecasted action;
   the action comprises the user selecting an application;
   the mission comprises a sequence of a plurality of tasks;
   each task having a task state of complete or not complete; and
   the forecasting a forecasted action comprises:
      automatically determining a probability of a future task given the mission and the tasks that have the task state of not complete;
      automatically determining a future user behavior given the future task; and
      automatically determining the forecasted action from the future task and the future user behavior.

2. The method of claim 1 wherein the inferring a user behavior comprises automatically determining a probability of the user behavior from the action with a pattern recognition algorithm.

3. The method of claim 2 wherein:
the action comprises at least a first and second action;
the pattern recognition algorithm comprises a first set of pattern recognition algorithm parameters for the first action and a second set of pattern recognition algorithm parameters for the second action; and
the method further comprises updating the second set of pattern recognition algorithm parameters according to a pattern learning algorithm.

4. The method of claim 1 wherein:
the action comprises an application use representing the user selecting an application; and
the inferring a user behavior from an action comprises automatically determining a probability of user behavior given the application use.

5. The method of claim 1 wherein the inferring a mission state from the action and the event comprises automatically determining a probability of the mission state from the action and the event with a pattern recognition algorithm.

6. The method of claim 5 wherein:
the action comprises at least a first action and second action;
the pattern recognition algorithm comprises a first set of pattern recognition algorithm parameters for the first action and a second set of pattern recognition algorithm parameters for the second action; and
further comprising updating the second set of pattern recognition algorithm parameters according to a pattern learning algorithm.

7. The method of claim 1 wherein:
the action comprises an application use representing the user selecting an application; and
the inferring a mission state from the action and the event comprises automatically determining a mission state based on the event and the application use.

8. The method of claim 1 wherein:
the action comprises an application use representing the user selecting an application; and
the inferring a mission state from the action and the event comprises automatically determining a joint probability of the mission state according to a probabilistic attributed graph matching algorithm comprising an application use generation factor, a task relation match factor and a mission state prior factor.

9. A method of power management, said method comprising:
inferring a user behavior of a user from an action;
inferring a mission state from the action and an event;
forecasting a forecasted action from the user behavior and the mission state;
outputting an instruction to modify a power resource allocation based on the forecasted action;
the action comprises an application use representing the user selecting an application;
the inferring a user behavior from an action comprises automatically determining a probability of user behavior according to a hierarchical probabilistic model given the application use, the event and a mission; and
the hierarchical probabilistic model configured to determine a P(B|U), a P(U) and a P(A|B,T,E) where P(B|U) is the probability of user behavior given the user, P(U) is a probability of the user and P(A|B,T,E) is a probability of the application use given the user behavior, a task and the event.

10. The method of claim 9 wherein the forecasting a forecasted action comprises automatically determining a probability of the forecasted action given the mission state and the user behavior with a pattern recognition algorithm.

11. The method of claim 10 wherein:
the action comprises at least a first and second action;
the pattern recognition algorithm comprises a first set of pattern recognition algorithm parameters for the first action and a second set of pattern recognition algorithm parameters for the second action; and
the method further comprises updating the second set of pattern recognition algorithm parameters according to a pattern learning algorithm.

12. The method of claim 9 wherein:
the action comprises the user selecting an application; and
the forecasting a forecasted action comprises automatically determining a probability of a future application use given the mission state and the user behavior.

13. A method for power management said method comprising:
inferring a user behavior of a user from an action;
inferring a mission state of a mission from the action;
forecasting a forecasted action from the user behavior and the mission state;
outputting an instruction to modify a power resource allocation based on the forecasted action;
the action comprises the user selecting an application;
the mission comprises a sequence of a plurality of tasks;
each task having a task state of complete or not complete; and
the forecasting a forecasted action comprises:
automatically determining a probability of a future task given the mission and the tasks that have the task state of not complete;
automatically determining a future user behavior given the future task; and
automatically determining the forecasted action from the future task and the future user behavior.

14. A processor based assembly for power management of a device, said assembly comprising:
a means to infer a user behavior of a user from an action;
a means to infer a mission state of a mission from the action;
a means to forecast a forecasted action from the user behavior and the mission state;
a means to output an instruction to modify a power resource allocation based on the forecasted action;
the action comprises the user selecting an application;
the mission comprises a sequence of a plurality of tasks;
each task having a task state of complete or not complete; and
the forecasting a forecasted action comprises:
automatically determining a probability of a future task given the mission and the tasks that have the task state of not complete;
automatically determining a future user behavior given the future task; and
automatically determining the forecasted action from the future task and the future user behavior.

15. The processor based assembly of claim 14 wherein the means to infer the user behavior comprises the processor executing instructions to determine a probability of user behavior given the action with a pattern recognition algorithm.

16. The processor based assembly of claim 14 wherein the means to infer the mission state comprises the processor executing instructions to determine a probability of the mission state given the action with a pattern recognition algorithm.

17. The processor based assembly of claim 14 wherein the means to forecast the forecasted action comprises the processor executing instructions to determine a probability of the forecasted action given the mission state and the user behavior with a pattern recognition algorithm.

\* \* \* \* \*